(12) United States Patent
Abe

(10) Patent No.: US 11,427,030 B2
(45) Date of Patent: Aug. 30, 2022

(54) NON-PNEUMATIC TIRE

(71) Applicant: BRIDGESTONE CORPORATION, Tokyo (JP)

(72) Inventor: Akihiko Abe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 263 days.

(21) Appl. No.: 16/611,997

(22) PCT Filed: Apr. 12, 2018

(86) PCT No.: PCT/JP2018/015370
§ 371 (c)(1),
(2) Date: Nov. 8, 2019

(87) PCT Pub. No.: WO2018/207543
PCT Pub. Date: Nov. 15, 2018

(65) Prior Publication Data
US 2021/0138836 A1    May 13, 2021

(30) Foreign Application Priority Data

May 11, 2017   (JP) .............................. JP2017-094666

(51) Int. Cl.
*B60C 7/18* (2006.01)
*B60C 7/14* (2006.01)

(52) U.S. Cl.
CPC ................ *B60C 7/18* (2013.01); *B60C 7/146* (2021.08)

(58) Field of Classification Search
CPC .......... B60C 7/18; B60C 7/146; B60C 7/107; B60C 2007/107; B60C 2007/146
See application file for complete search history.

(56) References Cited

U.S. PATENT DOCUMENTS 1,430,657 A    10/1922  Kennedy
9,120,351 B2 *  9/2015  Mun ........................ B60C 7/18
(Continued)

FOREIGN PATENT DOCUMENTS

CN    201619392 U    11/2010
CN    105109279 A    12/2015
(Continued)

OTHER PUBLICATIONS

International Search Report of PCT/JP2018/015370 dated Jul. 3, 2018.
(Continued)

*Primary Examiner* — Kip T Kotter
(74) *Attorney, Agent, or Firm* — Sughrue Mion, PLLC

(57) ABSTRACT

A non-pneumatic tire (1) includes three or more tubular bodies (2) and a plurality of elastically deformable connecting members (3) interconnecting the tubular bodies (2) and disposed along a tire circumferential direction in each annular space (9) provided between the tubular bodies (2) adjacent to each other in a tire radial direction. The tubular bodies (2) are provided with an inner tube (6) positioned on an innermost side in the tire radial direction and attached to an axle, an outer tube (4) positioned on an outermost side in the tire radial direction, and an elastically deformable intermediate tube (8) positioned between the inner tube (6) and the outer tube (4). The connecting member (3) is provided with a pair of connecting plates (21 and 22) having both end portions in the tire radial direction directly connected to the tubular body (2) and extending in the tire radial direction and separated in the tire circumferential direction from an outside toward an inside in the tire radial direction. A position (P1) of connection to the pair of connecting plates (21 and 22) connected to the intermediate tube (8) from the outside in the tire radial direction and a position (P2) of connection (Continued)

to the pair of connecting plates (21 and 22) connected to the intermediate tube (8) from the inside in the tire radial direction are shifted in the tire circumferential direction in the intermediate tube (8).

2 Claims, 4 Drawing Sheets

(56) References Cited

U.S. PATENT DOCUMENTS

| | | | | |
|---|---|---|---|---|
| 2010/0132865 | A1* | 6/2010 | Iwase | B60C 7/22 |
| | | | | 152/301 |
| 2011/0168313 | A1 | 7/2011 | Ma et al. | |
| 2012/0038206 | A1* | 2/2012 | Chadwick | B29D 30/02 |
| | | | | 301/37.23 |
| 2015/0122382 | A1 | 5/2015 | Choi et al. | |
| 2015/0251493 | A1 | 9/2015 | Ma | |
| 2017/0057288 | A1 | 3/2017 | Sugiya et al. | |
| 2017/0334245 | A1* | 11/2017 | Laskowitz | B60C 7/125 |
| 2017/0368869 | A1* | 12/2017 | Cron | B60C 7/14 |
| 2018/0222254 | A1 | 8/2018 | Abe | |
| 2019/0016076 | A1* | 1/2019 | Rivers | B29D 30/02 |
| 2019/0047328 | A1* | 2/2019 | Rivers | B29D 30/2607 |

FOREIGN PATENT DOCUMENTS

| | | |
|---|---|---|
| JP | 01-311902 A | 12/1989 |
| JP | 2013-079037 A | 5/2013 |
| JP | 2015-089809 A | 5/2015 |
| KR | 10-2016-0107448 A | 9/2016 |
| WO | 2007/057975 A1 | 5/2007 |
| WO | 2015/178209 A1 | 11/2015 |
| WO | 2016/089480 A1 | 6/2016 |
| WO | 2017/061405 A1 | 4/2017 |

OTHER PUBLICATIONS

Extended European Search Report dated Oct. 26, 2020 from the European Patent Office in Application No. 18797535.4.

* cited by examiner

NON-PNEUMATIC TIRE

CROSS REFERENCE TO RELATED APPLICATIONS

This application is a National Stage of International Application No. PCT/JP2018/015370 filed Apr. 12, 2018, claiming priority based on Japanese Patent Application No. 2017-094666 filed May 11, 2017, the contents of which are incorporated herein by reference.

TECHNICAL FIELD

The present invention relates to a non-pneumatic tire.

BACKGROUND ART

In the related art, a non-pneumatic tire described in, for example, Patent Document 1 below is known. The non-pneumatic tire is provided with a support structure that supports a load from a vehicle. The support structure is provided with an inside annular portion, an intermediate annular portion concentrically provided outside the inside annular portion, an outside annular portion concentrically provided outside the intermediate annular portion, a plurality of inside connecting portions interconnecting the inside annular portion and the intermediate annular portion, and a plurality of outside connecting portions interconnecting the outside annular portion and the intermediate annular portion. At least one of the inside connecting portion and the outside connecting portion is provided with a connecting portion main body extending along a tire radial direction and two branch portions branching from one end portion of the connecting portion main body and extending to the intermediate annular portion.

CITATION LIST

Patent Literature

[Patent Document 1] Japanese Unexamined Patent Application, First Publication No. 2013-79037

DISCLOSURE OF INVENTION

Technical Problem

However, in the non-pneumatic tire of the related art, at least one of the inside connecting portion and the outside connecting portion is provided with the connecting portion main body, and thus the deformation of the inside connecting portion and the outside connecting portion is restrained by the connecting portion main body and the problem of poor ride comfort arises when an external force has been input from a road surface to the non-pneumatic tire.

The present invention has been made in view of the above-described circumstances, and an object of the present invention is to improve ride comfort.

Solution to Problem

The present invention proposes the following means in order to solve the above problem.

A non-pneumatic tire according to the present invention includes three or more tubular bodies coaxially disposed at intervals in a tire radial direction and a plurality of elastically deformable connecting members interconnecting the tubular bodies and disposed along a tire circumferential direction in each annular space provided between the tubular bodies adjacent to each other in the tire radial direction among the three or more tubular bodies. The three or more tubular bodies are provided with an inner tube positioned on an innermost side in the tire radial direction and attached to an axle, an outer tube positioned on an outermost side in the tire radial direction, and an elastically deformable intermediate tube positioned between the inner tube and the outer tube. Each of the connecting members is provided with a pair of connecting plates having both end portions in the tire radial direction directly connected to the tubular body and extending so as to be separated in the tire circumferential direction from an outside toward an inside in the tire radial direction. A position of connection to the pair of connecting plates connected to the intermediate tube from the outside in the tire radial direction and a position of connection to the pair of connecting plates connected to the intermediate tube from the inside in the tire radial direction are shifted in the tire circumferential direction in the intermediate tube.

Advantageous Effects of Invention

According to the non-pneumatic tire described above, ride comfort can be improved.

BEST MODE FOR CARRYING OUT THE INVENTION

First Embodiment

Hereinafter, the configuration of a non-pneumatic tire according to the present embodiment will be described with reference to FIGS. 1 to 3. It should be noted that the scale in each of the drawings used in the following description is appropriately changed so that each member is recognizable in terms of size.

Figure 1:
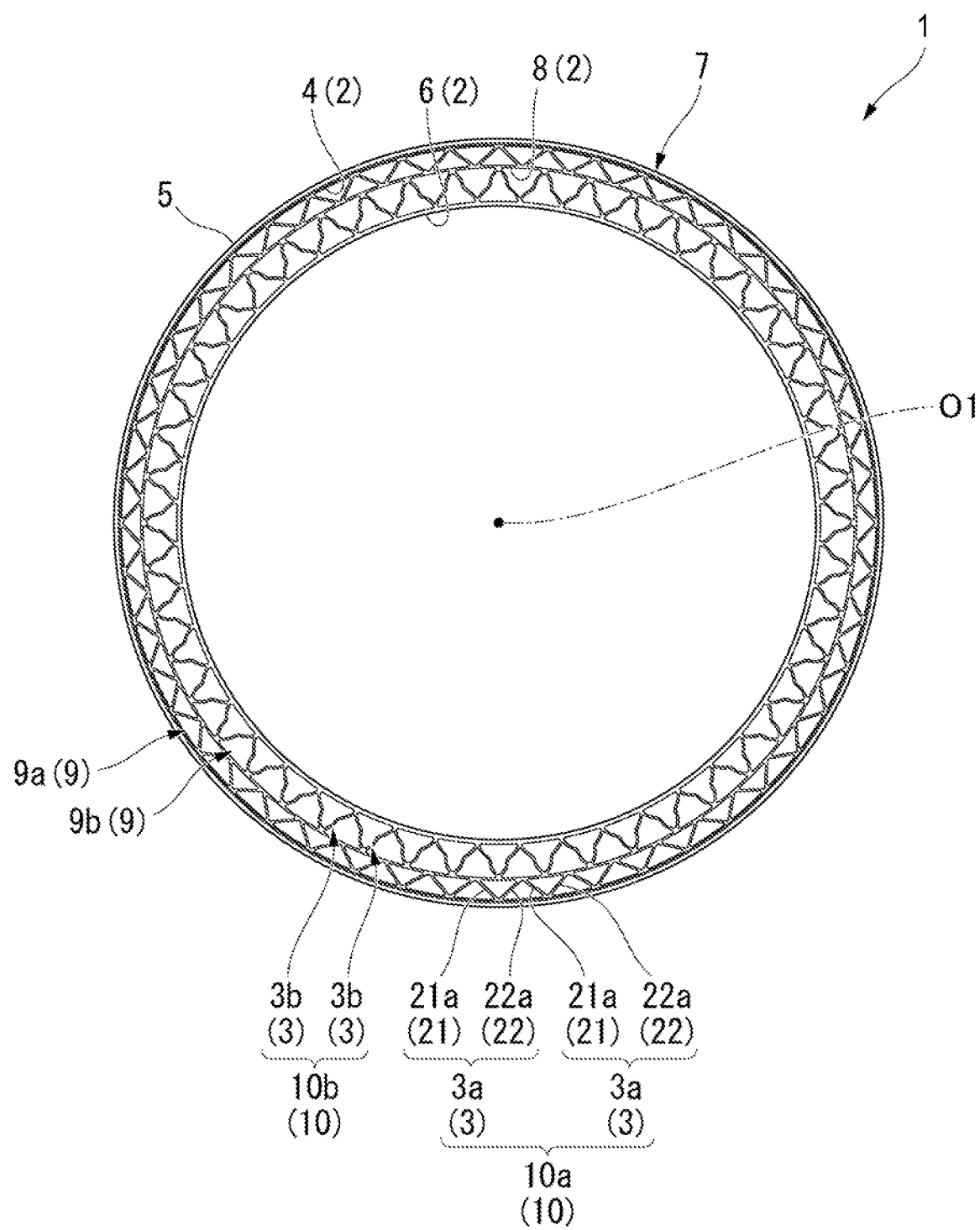
FIG. 1 is a side view of a non-pneumatic tire according to a first embodiment of the present invention.
Figure 2:
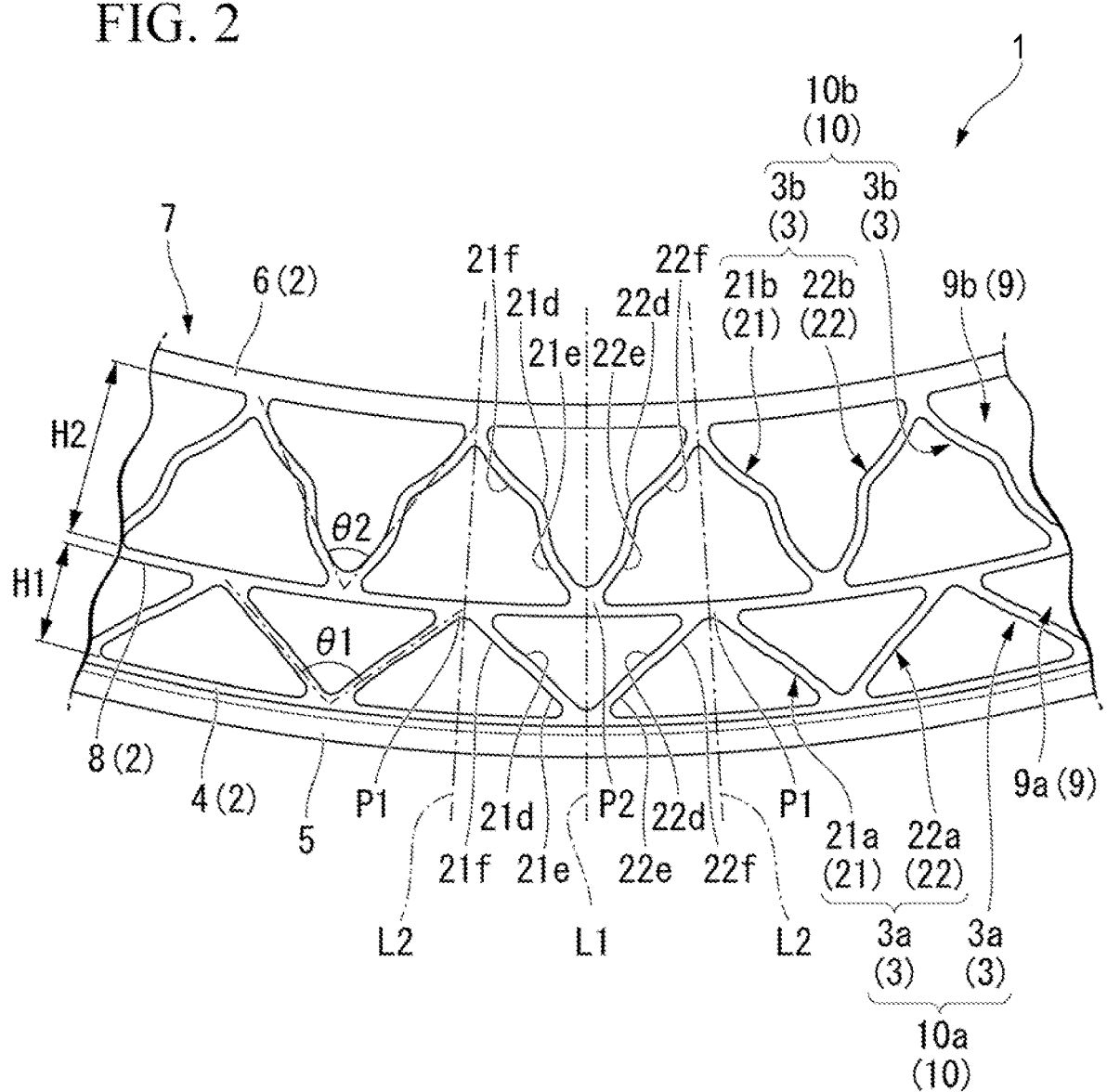
FIG. 2 is an enlarged side view of a main portion of the non-pneumatic tire shown in FIG. 1.
Figure 3:
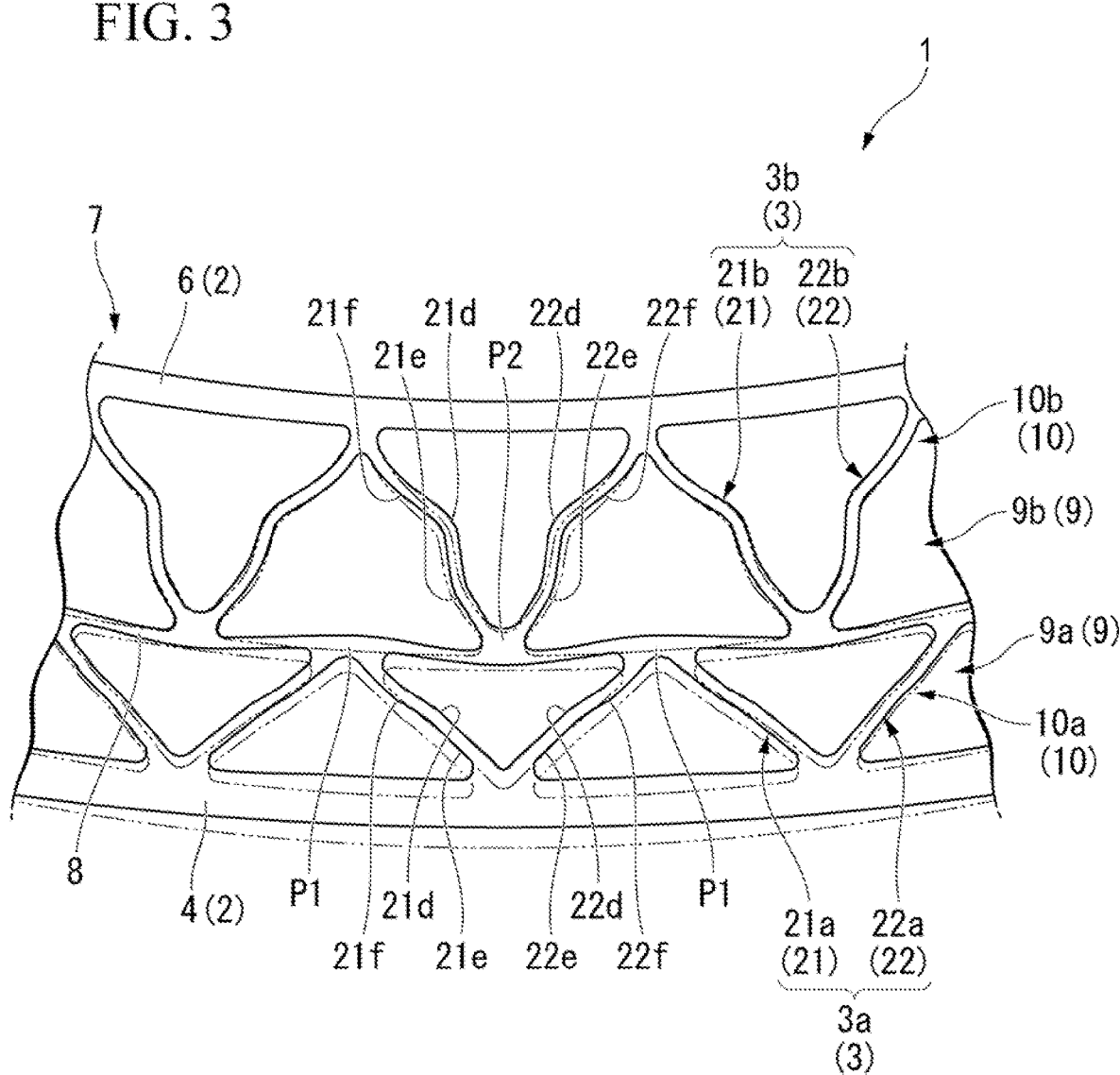
FIG. 3 is an enlarged side view of the main portion of the non-pneumatic tire shown in FIG. 2 and is a view showing a state where an external force has been input from a road surface to the non-pneumatic tire.

As shown in FIGS. 1 and 2, a non-pneumatic tire 1 is provided with a wheel portion (not shown) attached to an axle and a tire portion 7 disposed on the outer periphery of the wheel portion. The non-pneumatic tire 1 is used for bicycles, two-wheeled vehicles, automobiles, and the like (hereinafter, these generic names will be simply referred to as vehicles).

Here, the wheel portion is formed in a disc shape, the tire portion 7 is formed in an annular shape, and the central axes of the wheel portion and the tire portion 7 are positioned on a common axis. This common axis will be referred to as a central axis O1 and the direction that is along the central axis O1 will be referred to as a tire width direction. In addition, in a side view as viewed from the tire width direction, the direction that is around the central axis O1 will be referred to as a tire circumferential direction and the direction that is orthogonal to the central axis O1 will be referred to as a tire radial direction.

The tire portion 7 is provided with three tubular bodies 2 disposed in a multiple manner at intervals in the tire radial direction and a plurality of elastically deformable connecting members 3 interconnecting the tubular bodies 2 and disposed along the tire circumferential direction in an annular space 9 provided between the tubular bodies 2 that are adjacent to each other in the tire radial direction among the three tubular bodies 2.

The three tubular bodies 2 are disposed coaxially with each other. In the shown example, the central axes of the tubular bodies 2 are disposed coaxially with the central axis O1. The non-pneumatic tire 1 is provided with an inner tube 6 positioned on the innermost side in the tire radial direction and attached to the axle, an elastically deformable outer tube 4 positioned on the outermost side in the tire radial direction, and an elastically deformable intermediate tube 8 positioned between the inner tube 6 and the outer tube 4 as the three tubular bodies 2. In other words, the plurality of tubular bodies are provided in order such that one tubular body surrounds another tubular body.

The inner tube 6 is externally fitted to the wheel portion and attached to the axle via the wheel portion. The outer tube 4 surrounds the inner tube 6 and the intermediate tube 8 from the outside in the tire radial direction. A tread member 5 is fitted on the outer peripheral surface of the outer tube 4.

The tread member 5 is formed of, for example, vulcanized rubber in which natural rubber or/and a rubber composition is vulcanized or a thermoplastic material and the like. Examples of the thermoplastic material include a thermoplastic elastomer, a thermoplastic resin, and the like. Examples of the thermoplastic elastomer include the amide-based thermoplastic elastomer (TPA), the ester-based thermoplastic elastomer (TPC), the olefin-based thermoplastic elastomer (TPO), the styrene-based thermoplastic elastomer (TPS), the urethane-based thermoplastic elastomer (TPU), the cross-linked thermoplastic rubber (TPV), the other thermoplastic elastomer (TPZ), and the like defined in Japanese Industrial Standard (JIS) K6418. Examples of the thermoplastic resin include urethane resin, olefin resin, vinyl chloride resin, polyamide resin, and the like. It should be noted that the tread member 5 is preferably formed of vulcanized rubber from the viewpoint of wear resistance.

The annular space 9 is provided between the tubular bodies 2 that are adjacent to each other in the tire radial direction among the three tubular bodies 2. The annular space 9 is continuously provided over the entire circumference in the tire circumferential direction. The annular space 9 has a first annular space 9a (9) positioned on the outside in the tire radial direction and a second annular space 9b (9) positioned on the inside in the tire radial direction. The size of the annular space 9 in the tire radial direction gradually increases from the annular space 9 that is positioned on the outside in the tire radial direction toward the annular space 9 that is positioned on the inside in the tire radial direction. The size (width) of the annular space 9 (a connecting ring 10 to be described later) in the tire radial direction satisfies H1<H2 when H1 represents the annular space 9a (9) positioned on the outside in the tire radial direction and H2 represents the annular space 9b (9) positioned on the inside in the tire radial direction. In other words, the interval between the intermediate tube 8 and the inner tube 6 in the tire radial direction is larger than the interval between the intermediate tube 8 and the outer tube 4 in the tire radial direction. In other words, the size of the annular space 9 in the tire radial direction gradually increases from the outside in the tire radial direction toward the inside in the tire radial direction.

The connecting member 3 has a rigidity at which the connecting member 3 is not elastically deformed by the weight of the non-pneumatic tire 1. The connecting member 3 is disposed in each annular space 9 in a state where the position of the connecting member 3 in the tire circumferential direction is shifted. In the plurality of connecting members 3 disposed in the same annular space 9, the positions in the tire circumferential direction do not overlap. In addition, a connecting member 3a is provided in the first annular space 9a (9) and a connecting member 3b is provided in the second annular space 9b (9). In the side view, the connecting member 3 is formed in a V shape that opens toward the inside in the tire radial direction. The connecting member 3 is provided with a pair of connecting plates 21 and 22 having both end portions in the tire radial direction directly connected to the tubular body 2 and extending in the tire radial direction and separated in the tire circumferential direction from the outside toward the inside in the tire radial direction.

The pair of connecting plates 21 and 22 are elastically deformable plate materials having front and back surfaces facing the tire circumferential direction and side surfaces facing the tire width direction. The pair of connecting plates 21 and 22 are directly connected to the tubular body 2 and are not connected to the tubular body 2 via another component. The connection parts between the front and back surfaces of the pair of connecting plates 21 and 22 and the peripheral surface of the tubular body 2 are R-chamfered so as to form a circular arc shape (fillet) in the side view.

The pair of connecting plates 21 and 22 have equivalent breadths, lengths, and thicknesses along the tire width direction. The pair of connecting plates 21 and 22 are disposed at positions equivalent to each other in the tire width direction. The end portions of the pair of connecting plates 21 and 22 that are on the outside in the tire radial direction are disposed at equivalent positions in the tire circumferential direction. The end portions of the pair of connecting plates 21 and 22 that are on the outside in the tire radial direction form the end portion of the connecting member 3 that is on the outside in the tire radial direction. The end portions of the pair of connecting plates 21 and 22 that are on the inside in the tire radial direction are separated at an equivalent distance in the tire circumferential direction from the end portion of the connecting member 3 that is on the outside in the tire radial direction. The end portions of the pair of connecting plates 21 and 22 that are on the inside in the tire radial direction form the end portion of the connecting member 3 in the tire circumferential direction.

As a result of the above, the shape of each connecting member 3 in the tire side view is in line symmetry with respect to an imaginary line as an axis of symmetry that passes through the end portion of the connecting member 3 on the outside in the tire radial direction and the central axis O1 and extends along the tire radial direction. In addition, the tire-circumferential-direction end portions in the connecting members 3 that are adjacent to each other in the tire circumferential direction are interconnected and the end portions are disposed at equivalent positions in the tire circumferential direction. In addition, the tire-circumferential-direction end portions in the connecting members 3 that are adjacent to each other in the tire circumferential direction may not be interconnected.

The connecting member 3 is provided with the first connecting plate 21 and the second connecting plate 22 as the pair of connecting plates 21 and 22. As for the first connecting plate 21, the tire-radial-direction outside end portion (hereinafter, referred to as "first end portion") is positioned closer to one side in the tire circumferential direction than the tire-radial-direction inside end portion (hereinafter, referred to as "second end portion"). In contrast, as for the second connecting plate 22, the tire-radial-direction outside end portion (hereinafter, referred to as "third end portion") is positioned closer to the other side in the tire circumferential direction than the tire-radial-direction inside end portion (hereinafter, referred to as "fourth end portion").

In the pair of connecting plates 21 and 22, the first connecting plate 21 is positioned on the other side in the tire circumferential direction with respect to the second connecting plate 22. In the connecting members 3 that are adjacent to each other in the tire circumferential direction, the second end portion of the first connecting plate 21 forming the connecting member 3 positioned on one side in the tire circumferential direction and the fourth end portion of the second connecting plate 22 forming the connecting member 3 positioned on the other side in the tire circumferential direction are connected to each other.

Curved portions 21d to 21f and 22d to 22f curved in the tire circumferential direction are formed at the tire-radial-direction intermediate parts of one or both of the connecting plates 21 and 22 of the pair of connecting plates 21 and 22 (parts positioned between the first and second end portions and between the third and fourth end portions). In the present embodiment, the plurality of curved portions 21d to 21f and 22d to 22f are formed in both connecting plates 21 and 22 and the connecting plates 21 and 22 are provided with a plurality of inflection points in the side view.

In the tire side view in which the non-pneumatic tire 1 is viewed from the tire width direction, the plurality of curved portions 21d to 21f and 22d to 22f are formed along the extension direction in which the first connecting plate 21 and the second connecting plate 22 extend. In the shown example, the plurality of curved portions 21d to 21f in the first connecting plate 21 and the plurality of curved portions 22d to 22f in the second connecting plate 22 are adjacent to each other in the extension direction and have curve directions opposite to each other in the tire circumferential direction.

The plurality of curved portions 21d to 21f formed in the first connecting plate 21 have the first curved portion 21d curved so as to protrude toward one side in the tire circumferential direction, the second curved portion 21e positioned between the first curved portion 21d and the first end portion and curved so as to protrude toward the other side in the tire circumferential direction, and the third curved portion 21f positioned between the first curved portion 21d and the second end portion and curved so as to protrude toward the other side in the tire circumferential direction.

The plurality of curved portions 22d to 22f formed in the second connecting plate 22 have the first curved portion 22d curved so as to protrude toward the other side in the tire circumferential direction, the second curved portion 22e positioned between the first curved portion 22d and the third end portion and curved so as to protrude toward one side in the tire circumferential direction, and the third curved portion 22f positioned between the first curved portion 22d and the fourth end portion and curved so as to protrude toward one side in the tire circumferential direction.

In the shown example, the first curved portions 21d and 22d are formed so as to be smaller in radius of curvature (larger in curvature) in the tire side view than the second curved portions 21e and 22e and the third curved portions 21f and 22f and are disposed in the extension-direction middle portions of the first connecting plate 21 and the second connecting plate 22.

As a result of the above, the first curved portions 21d and 22d, the second curved portions 21e and 22e, and the third curved portions 21f and 22f of the first connecting plate 21 and the second connecting plate 22 have equivalent sizes while protruding in opposite directions in the tire circumferential direction.

The plurality of connecting members 3 disposed along the tire circumferential direction in the same annular space 9 form the connecting ring 10 interconnecting the tubular bodies 2 adjacent to each other in the tire radial direction over the entire circumference. The connecting ring 10 interconnects the tubular bodies 2 so as to be freely displaceable. The size (height, width) of the connecting ring 10 in the tire radial direction gradually increases (heightens) from the connecting ring 10 that is positioned on the outside in the tire radial direction toward the connecting ring 10 that is positioned on the inside in the tire radial direction. In other words, the size of the connecting ring 10 in the tire radial direction satisfies H1<H2 when H1 represents the size of a connecting ring 10a (the annular space 9a) positioned on the outside in the tire radial direction and H2 represents the size of a connecting ring 10b (the annular space 9b) positioned on the inside in the tire radial direction. In other words, the size of the connecting ring 10 in the tire radial direction gradually increases from the outside toward the inside in the tire radial direction. All of the connecting members 3 forming the same connecting ring 10 have shapes equivalent to each other, have sizes equivalent to each other, and are separately disposed at positions rotationally symmetric with respect to the central axis O1 in each annular space 9.

In the plurality of connecting rings 10, the same number of the connecting members 3 are provided so as to be disposed at equivalent positions in the tire circumferential direction. As for the connecting members 3 corresponding to each other in each of the plurality of connecting rings 10, the tire-circumferential-direction positions of the tire-radial-direction outside end portions in the respective connecting members 3 are equivalent and the tire-radial-direction outside end portion of each connecting member 3 is positioned on a first reference line L1, which extends in the tire radial direction through the central axis O1, in the side view. It should be noted that the imaginary line is positioned on the first reference line L1. In addition, as for the connecting members 3 corresponding to each other in each of the plurality of connecting rings 10, the tire-circumferential-direction positions of both tire-circumferential-direction end portions in the respective connecting members 3 are also equivalent and both tire-circumferential-direction end portions of each connecting member 3 are positioned on a second reference line L2 extending in the tire radial direction through the central axis O1.

In the side view, the angle that the pair of connecting plates 21 and 22 form in the end portion of the connecting member 3 on the outside in the tire radial direction (hereinafter, referred to as "V-shaped angle") gradually decreases from the connecting member 3 forming the connecting ring 10 positioned on the outside in the tire radial direction toward the connecting member 3 forming the connecting ring 10 positioned on the inside in the tire radial direction. The V-shaped angle is formed by a straight line connecting the first end portion and the second end portion of the first connecting plate 21 and a straight line connecting the third end portion and the fourth end portion of the second connecting plate 22 in the side view. As a result, the size (circumferential length) of the connecting member 3 in the tire circumferential direction gradually decreases from the connecting member 3 forming the connecting ring 10 positioned on the outside in the tire radial direction toward the connecting member 3 forming the connecting ring 10 positioned on the inside in the tire radial direction. $θ1>θ2$ is satisfied when the V-shaped angle is $θ1$ and $θ2$ in size in the order of the connecting member 3 of the connecting ring 10 positioned on the outside in the tire radial direction and the connecting member 3 of the connecting ring 10 positioned on the inside in the tire radial direction. In other words, $θ1>θ2$ is satisfied when the V-shaped angle of the connecting member 3a (3) of the connecting ring 10a (10) positioned on the outside in the tire radial direction is $θ1$ and the V-shaped angle of the connecting member 3b (3) of the connecting ring 10b (10) positioned on the inside in the tire radial direction is $θ2$. In other words, the size of the V-shaped angle gradually decreases from the outside in the tire radial direction toward the inside in the tire radial direction.

In addition, the size (height) of the connecting member 3 in the tire radial direction gradually increases (heightens) from the connecting member 3 forming the connecting ring 10 positioned on the outside in the tire radial direction toward the connecting member 3 forming the connecting ring 10 positioned on the inside in the tire radial direction.

As a result of the above, the size of the connecting member 3 in the tire radial direction increases, although the size of the connecting member 3 in the tire circumferential direction decreases, from the connecting member 3 forming the connecting ring 10 positioned on the outside in the tire radial direction toward the connecting member 3 forming the connecting ring 10 positioned on the inside in the tire radial direction. As a result, the length of each of the connecting plates 21 and 22 in the connecting member 3 can be equivalent with ease regardless of the position of the connecting member 3 in the tire radial direction.

It should be noted that the curvature of each of the curved portions 21d to 21f and 22d to 22f of the connecting member 3 gradually increases from the connecting member 3 forming the connecting ring 10 positioned on the outside in the tire radial direction toward the connecting member 3 forming the connecting ring 10 positioned on the inside in the tire radial direction.

Shifted in the tire circumferential direction in the intermediate tube 8 are the position of connection to the pair of connecting plates 21 and 22 connected to the intermediate tube 8 from the outside in the tire radial direction (hereinafter, referred to as "outside connection position P1") and the position of connection to the pair of connecting plates 21 and 22 connected to the intermediate tube 8 from the inside in the tire radial direction (hereinafter, referred to as "inside connection position P2"). The outside connection position P1 is along the tire circumferential direction regarding the part where the second and fourth end portions of the pair of connecting plates 21a (21) and 22a (22) (tire-circumferential-direction end portions of the connecting member 3) are connected on the outer peripheral surface of the intermediate tube 8. The inside connection position P2 is along the tire circumferential direction regarding the part where the first and third end portions of the pair of connecting plates 21b (21) and 22b (22) (tire-radial-direction outside end portions of the connecting member 3) are connected on the inner peripheral surface of the intermediate tube 8. The outside connection position P1 and the inside connection position P2 are alternately disposed in the intermediate tube 8 along the tire circumferential direction. The tire-circumferential-direction interval between the outside connection position P1 and the inside connection position P2 is equivalent over the entire circumference in the tire circumferential direction.

In the present embodiment, the tubular body 2 and the connecting member 3 are integrally formed of a thermoplastic resin. As a result, the tire portion 7 can be molded by injection molding and is suitable for mass production. The thermoplastic resin may be one type of resin, a mixture containing two or more types of resins, a mixture containing one or more types of resins and one or more types of elastomers, or the like and the thermoplastic resin may contain an additive such as an anti-aging agent, a plasticizer, a filler, a pigment, and the like. The degree of freedom in terms of design can be ensured for the tire portion 7 by the tubular body 2 and the connecting member 3 being integrally formed of the thermoplastic resin as described above.

It should be noted that the tubular body 2 and the connecting member 3 may be formed separately from each other. In addition, the tubular body 2 and the connecting member 3 may be formed of a material other than the thermoplastic resin.

The tire portion 7 and the wheel portion may be integrally formed or may be separately formed. It should be noted that the wheel portion has the function of connecting the axle and the tire portion 7 to each other, the tire portion 7 is elastically deformable, and the tire portion 7 has the function of absorbing vibration transmitted from a ground surface to the axle. The wheel portion and the tire portion 7 may be formed of different materials since the wheel portion and the tire portion 7 have different functions as described above. For example, the tire portion 7 may be formed of a material having a relatively low elastic modulus so that vibration absorption performance is ensured and the wheel portion may be formed of a material larger in elastic modulus than the tire portion 7 so that robustness is ensured. In another example, the weight of the entire non-pneumatic tire 1 may be reduced by the wheel portion being formed of a material having a relatively small specific gravity.

As described above, in the non-pneumatic tire 1 according to the present embodiment, both end portions of the pair of connecting plates 21 and 22 are directly connected to the tubular body 2 and the pair of connecting plates 21 and 22 are separated in the tire circumferential direction from the outside toward the inside in the tire radial direction. Accordingly, each connecting member 3 can be formed in the V shape that opens toward the inside in the tire radial direction in the side view. As a result, each connecting member 3 as a whole can be flexibly and elastically deformed when, for example, an external force has been input from a road surface to the non-pneumatic tire 1.

It should be noted that the curved portions 21d to 21f and 22d to 22f are formed at the intermediate parts of the connecting plates 21 and 22 and the connecting plates 21 and 22 have a plurality of infection points in the side view in the present embodiment. As a result, it is possible to easily deform the connecting member 3 while ensuring the strength of the connecting member 3. In other words, as shown in FIG. 3, it is possible to deform the connecting plates 21 and 22 such that the curvature of each of the curved portions 21d to 21f and 22d to 22f increases when, for example, an external force has been input from a road surface to the non-pneumatic tire 1.

Further, in the intermediate tube 8, the outside connection position P1 and the inside connection position P2 are shifted in the tire circumferential direction. As a result, it is also possible to flexibly and elastically deform the intermediate tube 8 by relieving stress concentration as compared with a case where, for example, the outside connection position P1 and the inside connection position P2 in the intermediate tube 8 are positions equivalent to each other in the tire circumferential direction. In other words, as shown in FIG. 3, the intermediate tube 8 can be elastically deformed with ease toward the inside in the tire radial direction at the outside connection position P1 and the intermediate tube 8 can be elastically deformed with ease toward the outside in the tire radial direction at the inside connection position P2 when, for example, an external force has been input from a road surface to the non-pneumatic tire 1. It should be noted that the pre-elastic deformation shape of each member is indicated by a two-dot chain line in FIG. 3.

As described above, each connecting member 3 as a whole and the intermediate tube 8 can be flexibly and elastically deformed when, for example, an external force has been input from a road surface to the non-pneumatic tire 1, and thus it is possible to improve ride comfort by reducing the rigidity of the non-pneumatic tire 1 as a whole.

Further, it is possible to ensure a deformation amount in the non-pneumatic tire 1 as a whole while reducing the deformation amount of each member by flexibly and elastically deforming the intermediate tube 8 and each connecting member 3 as a whole. As a result, the strength of the non-pneumatic tire 1 can be ensured. It should be noted that the deformation during external force input may concentrate on the connecting member 3 and it may be impossible to ensure the strength of the connecting member 3 in a case where, for example, the inner tube 6 and the outer tube 4 are directly connected not via the intermediate tube 8 but by the connecting member 3. In this case, deformation suppression based on an increase in the rigidity of the connecting member 3 for the purpose of ensuring the strength of the connecting member 3 may lead to a decline in ride comfort.

In addition, the same number of the connecting members 3 can be disposed at the equivalent positions in the tire circumferential direction in each of the plurality of connecting rings 10 after each connecting member 3 is formed in the V shape described above. Accordingly, the outside connection position P1 and the inside connection position P2 in the intermediate tube 8 can be effectively shifted along the tire circumferential direction and the intermediate tube 8 and each connecting member 3 as a whole can be elastically deformed with more flexibility.

By the way, the circumferential length of the annular space 9 gradually decreases from the annular space 9 positioned on the outside in the tire radial direction toward the annular space 9 positioned on the inside in the tire radial direction. Accordingly, when the same number of the connecting members 3 are provided in each of the plurality of connecting rings 10, the connecting member 3 becomes smaller in the tire circumferential direction in the connecting ring 10 positioned on the inside in the tire radial direction than in the connecting ring 10 positioned on the outside in the tire radial direction, and thus it becomes difficult to ensure the lengths of the connecting plates 21 and 22.

However, in the present embodiment, the size of the annular space 9 in the tire radial direction increases from the annular space 9 positioned on the outside in the tire radial direction toward the annular space 9 positioned on the inside in the tire radial direction. Accordingly, the connecting member 3 can be longer (higher) in the tire radial direction in the connecting ring 10 positioned on the inside in the tire radial direction than in the connecting ring 10 positioned on the outside in the tire radial direction. As a result, the lengths of the connecting plates 21 and 22 of the connecting member 3 forming each connecting ring 10 can be easily and equivalently ensured regardless of the position of the connecting ring 10 in the tire radial direction. As a result, the connecting member 3 can be flexibly deformed in an effective manner and the ride comfort can be reliably enhanced.

In addition, the V-shaped angle gradually decreases from the connecting member 3 forming the connecting ring 10 positioned on the outside in the tire radial direction toward the connecting member 3 forming the connecting ring 10 positioned on the inside in the tire radial direction. Accordingly, it is possible to reduce the size of the connecting member 3 in the tire circumferential direction while ensuring the lengths of the connecting plates 21 and 22 of the connecting member 3 as described above in the connecting ring 10 positioned on the inside in the tire radial direction. As a result, the same number of the connecting members 3 as in the annular space 9 having a long circumferential length and positioned on the outside in the tire radial direction can be reliably provided even in the annular space 9 having a short circumferential length and positioned on the inside in the tire radial direction.

Second Embodiment

Figure 4:
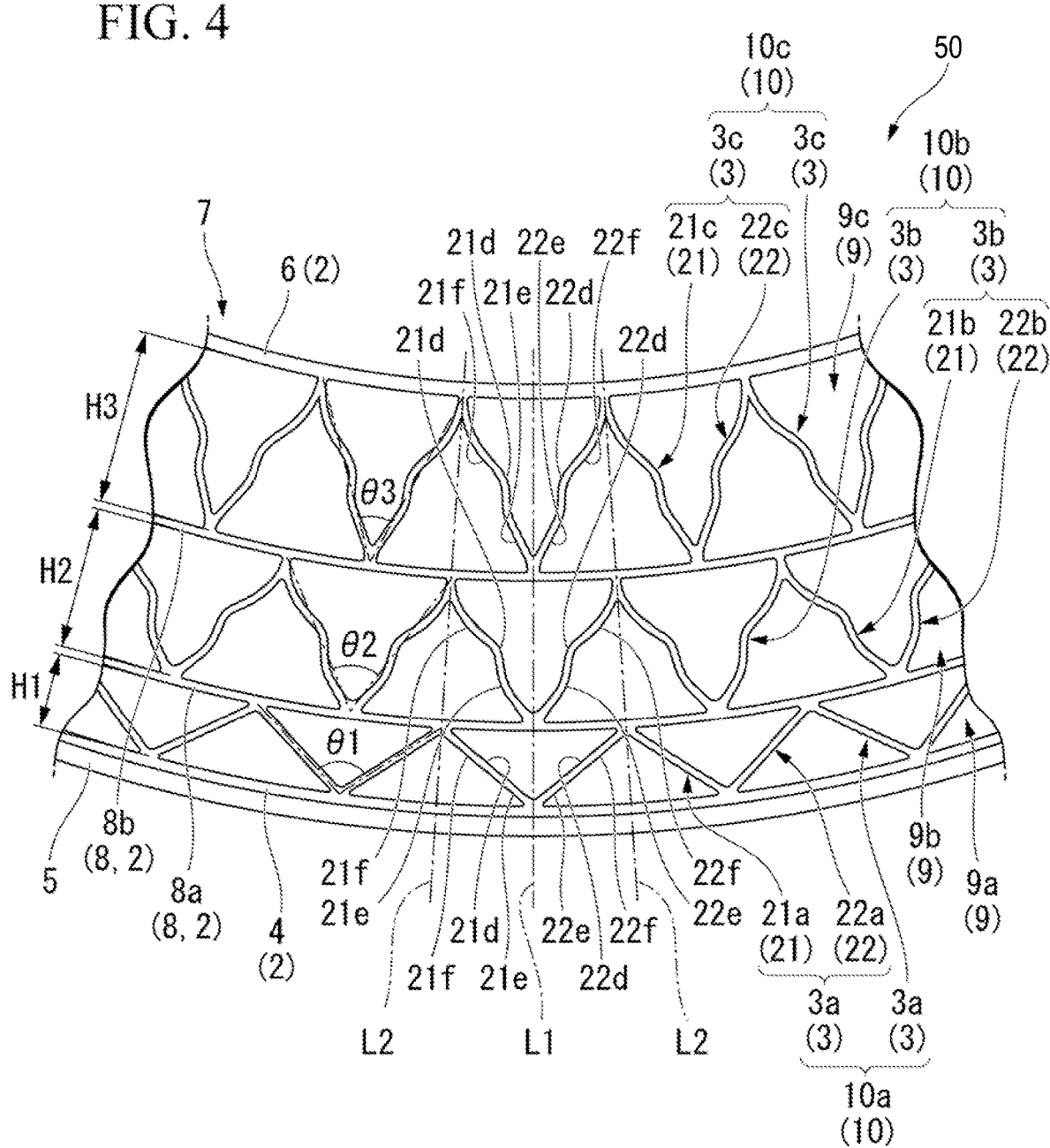
FIG. 4 is an enlarged side view of a main portion of a non-pneumatic tire according to a second embodiment of the present invention.

Next, a non-pneumatic tire 50 according to a second embodiment of the present invention will be described with reference to FIG. 4.

It should be noted that parts of the second embodiment identical to components of the first embodiment will be denoted by the same reference numerals, the identical parts will not be described, and only differences will be described below.

Four tubular bodies 2 are provided in the non-pneumatic tire 50 according to the present embodiment. The non-pneumatic tire 50 is provided with one inner tube 6, one outer tube 4, and two intermediate tubes 8 as the tubular bodies 2. In addition, an outside intermediate tube 8a (8) positioned on the outside in the tire radial direction and an inside intermediate tube 8b (8) positioned on the inside in the tire radial direction are the two intermediate tubes 8. As a result, three annular spaces 9 and three connecting rings 10 are formed. Assuming that the three connecting rings 10 are the first ring 10a, the second ring 10b, and a third ring 10c in order from the outside toward the inside in the tire radial direction, the first ring 10a interconnects the outer tube 4 and the intermediate tube 8, the second ring 10b interconnects the intermediate tubes 8 (the outside intermediate tube 8a (8) and the inside intermediate tube 8b (8)), and the third ring 10c interconnects the intermediate tube 8 and the inner tube 6. In addition, the connecting members that form the first ring 10a, the second ring 10b, and the third ring 10c are referred to as the first connecting member 3a, the second connecting member 3b, and a third connecting member 3c, respectively. Further, the connecting members 3a, 3b, and 3c are disposed in the first annular space 9a, the second annular space 9b, and a third annular space 9c, respectively. The size of the annular space 9 in the tire radial direction satisfies H1<H2<H3 when the size of the annular space 9 in the tire radial direction is H1, H2, and H3 in order from the annular space 9 positioned on the outside in the tire radial direction to the annular space 9 positioned on the inside in the tire radial direction (in the order of the annular spaces 9a, 9b, and 9c). In other words, the size of the annular space 9 in the tire radial direction gradually increases from the outside in the tire radial direction toward the inside in the tire radial direction. In addition, the size of the V-shaped angle satisfies θ1>θ2>θ3 when the V-shaped angles of the connecting members 3a, 3b, and 3c are θ1, θ2, and θ3 in the order of the connecting member 3 of the connecting ring 10 positioned on the outside in the tire radial direction to the connecting member 3 of the connecting ring 10 positioned on the inside in the tire radial direction. In other words, the size of the V-shaped angle gradually decreases from the outside in the tire radial direction toward the inside in the tire radial direction.

According to this invention, both end portions of the pair of connecting plates are directly connected to the tubular body and the pair of connecting plates are separated in the tire circumferential direction from the outside toward the inside in the tire radial direction. Accordingly, each connecting member can be formed in the V shape that opens toward the inside in the tire radial direction in the side view as viewed from the tire width direction. As a result, each connecting member as a whole can be flexibly and elastically deformed when, for example, an external force has been input from a road surface to the non-pneumatic tire.

Further, in the intermediate tube, the outside connection position as the position of connection to the pair of connecting plates connected to the intermediate tube from the outside in the tire radial direction and the inside connection position as the position of connection to the pair of connecting plates connected to the intermediate tube from the inside in the tire radial direction are shifted in the tire circumferential direction. As a result, it is also possible to flexibly and elastically deform the intermediate tube by relieving stress concentration as compared with a case where, for example, the outside connection position and the inside connection position in the intermediate tube are positions equivalent to each other in the tire circumferential direction.

As described above, each connecting member as a whole and the intermediate tube can be flexibly and elastically deformed when, for example, an external force has been input from a road surface to the non-pneumatic tire, and thus it is possible to improve ride comfort by reducing the rigidity of the non-pneumatic tire as a whole.

Further, it is possible to ensure a deformation amount in the non-pneumatic tire as a whole while reducing the deformation amount of each member by flexibly and elastically deforming the intermediate tube and each connecting member as a whole. As a result, the strength of the non-pneumatic tire can be ensured. It should be noted that the deformation during external force input may concentrate on the connecting member and it may be impossible to ensure the strength of the connecting member in a case where, for example, the inner tube and the outer tube are directly connected not via the intermediate tube but by the connecting member. In this case, deformation suppression based on an increase in the rigidity of the connecting member for the purpose of ensuring the strength of the connecting member may lead to a decline in ride comfort.

The plurality of connecting members disposed along the tire circumferential direction in each of the annular spaces form the connecting ring interconnecting the tubular bodies over the entire circumference and the same number of the connecting members are provided so as to be disposed at equivalent positions in the tire circumferential direction in the plurality of connecting rings.

In this case, the same number of the connecting members can be disposed at the equivalent positions in the tire circumferential direction in each of the plurality of connecting rings after each connecting member is formed in the V shape described above. Accordingly, the outside connection position and the inside connection position in the intermediate tube can be effectively shifted along the tire circumferential direction and the intermediate tube and each connecting member as a whole can be elastically deformed with more flexibility.

The size of the annular space in the tire radial direction gradually increases from the annular space positioned on the outside in the tire radial direction toward the annular space positioned on the inside in the tire radial direction.

The circumferential length of the annular space gradually decreases from the annular space positioned on the outside in the tire radial direction toward the annular space positioned on the inside in the tire radial direction. Accordingly, when the same number of the connecting members are provided in each of the plurality of connecting rings, the connecting member becomes smaller in the tire circumferential direction in the connecting ring positioned on the inside in the tire radial direction than in the connecting ring positioned on the outside in the tire radial direction, and thus it becomes difficult to ensure the lengths of the connecting plates.

However, in this case, the size of the annular space in the tire radial direction increases from the annular space positioned on the outside in the tire radial direction toward the annular space positioned on the inside in the tire radial direction. Accordingly, the connecting member can be longer (higher) in the tire radial direction in the connecting ring positioned on the inside in the tire radial direction than in the connecting ring positioned on the outside in the tire radial direction. As a result, the lengths of the connecting plates of the connecting member forming each connecting ring can be easily and equivalently ensured regardless of the position of the connecting ring in the tire radial direction. As a result, the connecting member can be flexibly deformed in an effective manner and the ride comfort can be reliably enhanced.

In the side view as viewed from the tire width direction, the angle that the pair of connecting plates form in the end portion of the connecting member on the outside in the tire radial direction gradually decreases from the connecting member forming the connecting ring positioned on the outside in the tire radial direction toward the connecting member forming the connecting ring positioned on the inside in the tire radial direction.

In this case, in the side view, the angle that the pair of connecting plates form in the end portion of the connecting member on the outside in the tire radial direction gradually decreases from the connecting member forming the connecting ring positioned on the outside in the tire radial direction toward the connecting member forming the connecting ring positioned on the inside in the tire radial direction. Accordingly, it is possible to reduce the size of the connecting member in the tire circumferential direction while ensuring the lengths of the connecting plates of the connecting member as described above in the connecting ring positioned on the inside in the tire radial direction. As a result, the same number of the connecting members as in the annular space having a long circumferential length and positioned on the outside in the tire radial direction can be reliably provided even in the annular space having a short circumferential length and positioned on the inside in the tire radial direction.

A curved portion curved in the tire circumferential direction may be formed at the tire-radial-direction intermediate part of one or both of the connecting plates of the pair of connecting plates.

In this case, the curved portion is formed at the intermediate part of the connecting plate and the connecting plate has a plurality of inflection points in the side view. As a result, it is possible to easily deform the connecting member while ensuring the strength of the connecting member and further improve the ride comfort.

It should be noted that the technical scope of the present invention is not limited to the embodiments described above and various modifications can be made without departing from the scope of the present invention.

The curved portions 21d to 21f and 22d to 22f may be omitted and the tread member 5 may be omitted.

The tubular bodies 2 are not limited to three or four in number and it is possible to appropriately adopt a form in which the tubular bodies 2 are three or more in number.

The size of the annular space 9 in the tire radial direction may not gradually increase from the annular space 9 positioned on the outside in the tire radial direction toward the annular space 9 positioned on the inside in the tire radial direction.

In addition, it is possible to appropriately replace the components in the above-described embodiments with known components without departing from the scope of the present invention and the above-described modified examples may be appropriately combined.

INDUSTRIAL APPLICABILITY

According to the non-pneumatic tire described above, ride comfort can be improved.

REFERENCE SIGNS LIST 1, 50 Non-pneumatic tire
2 Tubular body
3, 3a, 3b, 3c Connecting member
4 Outer tube
6 Inner tube
8, 8a, 8b Intermediate tube
9, 9a, 9b, 9c Annular space
10, 10a, 10b, 10c Connecting ring
21, 22, 21a, 22a, 21b, 22b, 21c, 22c Connecting plate
21d, 21e, 21f, 22d, 22e, 22f Curved portion

What is claimed is:

1. A non-pneumatic tire comprising:
three or more tubular bodies coaxially disposed at intervals in a tire radial direction; and
a plurality of elastically deformable connecting members interconnecting the tubular bodies and disposed along a tire circumferential direction in each annular space provided between the tubular bodies adjacent to each other in the tire radial direction among the three or more tubular bodies, wherein
the three or more tubular bodies are comprised of an inner tube positioned on an innermost side in the tire radial direction and to be attached to an axle, an outer tube positioned on an outermost side in the tire radial direction, and an elastically deformable intermediate tube positioned between the inner tube and the outer tube,
each of the connecting members is provided with a pair of connecting plates having both end portions in the tire radial direction directly connected to the three or more tubular bodies adjacent to each other and extending so as to be separated in the tire circumferential direction from an outside toward an inside in the tire radial direction,
positions where the pair of connecting plates are connected to the intermediate tube from the outside in the tire radial direction and positions where the pair of connecting plates are connected to the intermediate tube from the inside in the tire radial direction are shifted in the tire circumferential direction in the intermediate tube,
the plurality of connecting members disposed along the tire circumferential direction in each of the annular spaces form a connecting ring interconnecting the tubular bodies over an entire circumference,
the same number of the connecting members are provided in each of a plurality of the connecting rings so as to be disposed at positions equivalent in the tire circumferential direction,
a size of the annular space in the tire radial direction gradually increases from the annular space positioned on the outside in the tire radial direction toward the annular space positioned on the inside in the tire radial direction, and
an angle formed by the pair of connecting plates in an end portion of each of the connecting members on the outside in the tire radial direction gradually decreases from the connecting members forming one of the plurality of the connecting rings positioned on the outside in the tire radial direction toward the connecting members forming one of the plurality of the connecting rings positioned on the inside in the tire radial direction in a side view as viewed from a tire width direction.

2. The non-pneumatic tire according to claim 1, wherein a curved portion curved in the tire circumferential direction is formed at a tire-radial direction intermediate part of one or both the connecting plates of the pair of connecting plates connected to the intermediate tube from the outside and inside in the tire radial direction.

* * * * *